United States Patent
Monari

(10) Patent No.: US 7,127,438 B2
(45) Date of Patent: Oct. 24, 2006

(54) METHOD OF REGULATING AND CONTROLLING A TECHNICAL PROCESS SUCH AS SPOT-WELDING OF METAL SHEETS

(75) Inventor: Gaëtan Monari, Eyguieres (FR)

(73) Assignee: USINOR, Puteaux (FR)

( * ) Notice: Subject to any disclaimer, the term of this patent is extended or adjusted under 35 U.S.C. 154(b) by 443 days.

(21) Appl. No.: 10/469,006

(22) PCT Filed: Feb. 12, 2002

(86) PCT No.: PCT/FR02/00516

§ 371 (c)(1),
(2), (4) Date: Aug. 26, 2003

(87) PCT Pub. No.: WO02/071162

PCT Pub. Date: Sep. 12, 2002

(65) Prior Publication Data

US 2004/0073319 A1 Apr. 15, 2004

(30) Foreign Application Priority Data

Mar. 1, 2001 (FR) .................................. 01 02788

(51) Int. Cl.
*G06E 1/00* (2006.01)
(52) U.S. Cl. ........................................ 706/21; 219/110
(58) Field of Classification Search ................ 706/21; 219/110

See application file for complete search history.

(56) References Cited

U.S. PATENT DOCUMENTS

| 4,639,853 | A | 1/1987 | Rake et al. |
|---|---|---|---|
| 4,861,960 | A | 8/1989 | Bernstein et al. |
| 5,859,773 | A | 1/1999 | Liano et al. |
| 6,018,729 | A * | 1/2000 | Zacharia et al. ............... 706/21 |
| 6,506,997 | B1 * | 1/2003 | Matsuyama .................. 219/110 |

OTHER PUBLICATIONS

"An intl control system for resistance spot welding using a neural network & fuzzy logic", Messler, R.W., Jr.; Min Jou; Li, C.J.; Industry Applications Conf, 1995. Thirtieth IAS Annual Meeting. Conf Rec of the 1995 IEEE, Vol. 2, Oct. 8-12, 1995, pp. 1757-1763.*

"Control of Resistance Spot Welding", Shriver, J.; Huei Peng; Hu, S.J.; American Control Conference, 1999. Proceedings of the 1999, Vol. 1, Jun. 2-4 1999, pp. 187-191.*

"Neural Network-Based Resistance Spot Welding Control & Quality Prediction", Ivezic, N.; Alien, J.D., Jr.; Zacharia, T.; Intelligt Processing and Manufacturing of Materials, 1999. Proc of the 2nd International Conf on Vol. 2, Jul. 10-15, 1999, pp. 989-994.*

* cited by examiner

*Primary Examiner*—David Vincent
*Assistant Examiner*—Mai T. Tran
(74) *Attorney, Agent, or Firm*—Sughrue Mion, PLLC

(57) ABSTRACT

A method for controlling and driving a technical process executed in time by applying at each time t instructions Ci(t), leading to a measurable but not observable result R(t) and generating a plurality of observable quantities distinct from the result R(t) whereof at least two are independent Gj(t), which consists in: measuring at least two independent observable quantities Gj(t), Gp(t); with a predictive model M, or a set of models, whereof the variables comprise the at least two independent observable quantities, calculating an estimation Res(t)=M(G1(t), Gp(t) of the result R(t); using a drive law L, whereof the input variable is the estimated result Res(t) calculating new instructions Ci(t+1), applicable for time t+1; and replacing the instructions [C1(t), Cn(t)] by the instructions [C1(t), Cn(t+1)]. The method for controlling and driving a technical process is applicable to spot welding.

16 Claims, 3 Drawing Sheets

METHOD OF REGULATING AND CONTROLLING A TECHNICAL PROCESS SUCH AS SPOT-WELDING OF METAL SHEETS

FIELD OF THE INVENTION

The present invention relates to a method of regulating and controlling a technical process which is executed in time either in a continuous manner or in a discontinuous manner, the process being in particular spot-welding of an assembly of metal sheets.

DESCRIPTION OF RELATED ART

The technical processes which can be regulated and controlled by control systems are very varied and are to be found in all industries. In general, a process transforms an object, characterised by quantities which are input quantities for the process, into another object characterised by quantities which are output quantities for the process. The execution of the process can be controlled by desired quantities corresponding to regulating parameters fixed by an operator or by a control system. Also in general, it is desired that at least one output quantity should remain close to an intended value, and it is then said that this quantity is regulated. In order to achieve this objective, that is to say obtaining an output quantity having a value close to the intended value, the desired quantities are adjusted. The adjustment of the desired quantities on the basis of the measurement of characteristic quantities of the process, as well as the use of these measurements for monitoring the execution thereof, constitutes the method of regulating and controlling the process. It should be noted that, if the output quantities are variables which are independent of one another, it is only possible to regulate one and only one of these quantities. It will therefore be assumed in the following that only one output quantity is regulated, even if the process can be characterised by several output quantities which are independent of one another. In the following the output quantity to be regulated will also be called the "result". Finally, the execution of the process may in general be characterised by quantities linked to the phenomena brought into play by the process; these quantities are neither input quantities nor output quantities.

An input or output quantity, or any other quantity associated with the process, may or may not be measured and, if it may be measured the measurement may or may not be carried out in real time without disrupting the process. In the following:

"Measurable quantity" will be used to mean a quantity which can be measured, that is to say to which it is possible to make a numerical value correspond; such a quantity is not necessarily measurable in real time.

"Observable quantity" will be used to mean a measurable quantity which can be measured directly on the process or on the product directly resulting from the process, in real time.

Methods for regulating and controlling a process are known for example which consist of measuring the output quantity to be regulated, comparing this measurement with the intended value then, using a control law, modifying the desired quantities. Such a process assumes that the output quantity in question can be measured in real time.

In a variant of the preceding method, the quantity to be regulated is not measurable in real time but is correlated in a known manner with another output quantity which is itself measurable in real time. In this case the quantity to be regulated is replaced by the measurable output quantity and this latter quantity is adjusted.

Methods for regulating and controlling a process are also known which consists of measuring the input quantities and calculating the desired quantities using a model of which the variables are the measured input quantities and the intended output value. This model then constitutes the control law; it does not permit calculation of a forecast value for the output quantity to be regulated. Such a process assumes that it is possible to measure the input quantities and that a suitable model is available.

Methods of regulating and controlling a process are also known which consist of measuring the input quantities, calculating with the aid of a predictive model, the variables of which are the input quantities and the desired quantities, an estimate of the value of the output quantity to be regulated, comparing this estimate with the intended value and using this comparison in order to modify the desired quantities using a drive law. Such a process assumes that the input quantities can be measured in real time and that a suitable predictive model is available.

Finally, methods of regulating and controlling a process are known which use a model permitting calculation, on the basis of the output quantity to be regulated and the desired quantities, of the value of an output quantity which is easy to measure, different from the quantity to be regulated but closely correlated therewith. In this method, on the basis of the intended value for the output quantities to be regulated and the desired quantities, an intended value is calculated for the output quantity which is easy to measure, then the measured value of this quantity is compared with the intended value, and on the basis of this comparison the desired quantities are modified using a control law. This method assumes in particular that at least one output quantity which is easy to measure is known, which can be calculated on the basis of a model of which the variables are the output quantity to be regulated and desired quantities.

However, processes exist to which none of these methods of regulation and control are applicable. This is so in particular in the case of spot-welding of an assembly of metal sheets. In effect, in this process the result to be obtained can only be measured by a destructive test and cannot therefore be used for continuously regulating and controlling the process. On the other hand, the result depends not only upon the input and desired quantities but also upon the wear on the device used for carrying out the welding. But no reliable means are known for measuring the wear on the device. Therefore it is not possible on the basis of the input and desired quantities to forecast either the quality of the weld nor any other output quantity which, by itself, would be representative of the quality of the weld. Finally, no output quantity closely correlated with the result to be regulated is known.

Therefore there are processes, of which spot-welding is an example, in which the input quantities, the output quantities and the desired quantities do not allow the known methods of regulation to be implemented.

SUMMARY OF THE INVENTION

The object of the present invention is to remedy this drawback by proposing a means for continuously regulating and controlling a technical process such as spot-welding in which it is not possible to observe (in the sense defined above) the result obtained, and for which this result cannot be forecast on the basis only of the measurements of the measurable input quantities or of one single measurable output quantity.

Therefore the invention relates to a method of regulating and controlling a technical process which is executed in time either in a continuous manner or in a discontinuous manner by applying at each time t desired values $\{C_1(t), \ldots, C_n(t)\}$ leading to a result $R(t)$ which is measurable but not observable which it is desired to keep close to an intended value $R_v$, and generating a plurality of observable quantities of which at least two are independent $\{G_1(t), \ldots, G_m(t)\}$ according to which:

- at least two independent observable quantities $G_1(t), \ldots, G_p(t)$ are measured,
- with the aid of a predictive model M, or a set of models, of which the input variables include the at least two independent observable quantities and possibly at least one desired value $C_1(t), \ldots, C_q(t)$, an estimate $R_{es}(t)=M(G_1(t), \ldots, G_p(t), C_1(t), \ldots, C_q(t))$ of the result $R(t)$ is calculated,
- with the aid of a control law L of which the input variable is the estimated result $R_{es}(t)$ and the intended result $R_v$, new desired values $\{C_1(t+1), \ldots, C_n(t+1)\}=L(R_{es}(t), R_v)$ are calculated which are applicable for the time t+1,
- and the desired values $\{C_1(t), \ldots, C_n(t)\}$ are replaced by the desired values $\{C_1(t+1), \ldots, C_n(t+1)\}$.

The predictive model M may be a statistical adjustment model depending upon parameters $\{\theta_1, \ldots, \theta_p\}$ which constitute a parameters vector $\theta$ adjusted on a learning base $B_{ap}$ consisting of all of the desired values, the measurements of the observable quantities and the measurement of the result for a plurality of successive executions of the technical process.

In order to determine the model M it is possible, for example, to proceed in the following manner:

- a model structure is chosen depending upon a parameter vector $\theta$,
- a cost function J is chosen having for example a quadratic form,
- with the learning base a succession of adjusted models $M_{a,k}$ is calculated corresponding to different parameter vectors $\theta_k$ of dimension $q_k$ which minimise, globally or locally, the cost function on the learning base,
- for each model $M_{a,k}$ the coefficients $h_{ii}$ of each of the examples of the learning base are calculated, and the generalised score of the model $M_{a,k}$ is calculated:

$$E(\theta_{a,k}) = \sum_{i=1,N} [(M_{a,k}(x^i; \theta_{a,k}) - R_i)/(1 - h_{ii})]^2$$

and a quantity $$\mu(\theta_{a,k}) = (N \cdot q_k)^{-1/2} \sum_{i=1 \text{ to } N} h_{ii}^{1/2}$$

is calculated and the model $M_{a,k}$ having the greatest $\mu(\theta_{a,k})$ is chosen from amongst the models having the smallest $E(\theta_{a,k})$; this model is the optimal model $M_{a,opt}$.

Preferably:

- for the measurement of the result R a dispersion range $[\sigma_{min}, \sigma_{max}]$ of the standard deviation of the measuring error is determined,
- and the parameters $\{\theta_1, \ldots, \theta_p\}$ of the predictive model M are adjusted in such a way that on a test base $B_{test}$ it has a score S such that $\sigma_{min}<S<\sigma_{max}$, the test base consisting of all of the instructions, the measurements of observable quantities and the measurement of the result for a plurality of successive executions of the technical process, different from the learning base.

In order to adjust the parameters $\{\theta_1, \ldots, \theta_p\}$ of the predictive model M, it is possible to choose a first learning base $B_{ap}$ and a first test base $B_{test}$ and to proceed as follows: with the aid of the said first learning base a first estimate of the parameters $\{\theta_1, \ldots, \theta_p\}$ is determined in such a way that the score of the model M for the learning base is within the dispersion range $[\sigma_{min}, \sigma_{max}]$, then, using this first estimate of the parameters in the model M, with the aid of the first test base $B_{test}$, the score S is evaluated and compared with the dispersion range $[\sigma_{min}, \sigma_{max}]$. If S is within the said dispersion range it is considered that the estimate of the parameters is satisfactory, in the opposite case the learning base $B_{ap}$ is completed with examples taken from the first test base in order to constitute a new learning base, the test base is completed if need be and the parameters $\{\theta_1, \ldots, \theta_p\}$ are determined again with the aid of the new learning base and the score S on the new test base, and the iterations are continued until the score S is within the dispersion range $[\sigma_{min}, \sigma_{max}]$.

In order to complete the learning base with examples taken from the test base it is possible:

- to fix a confidence interval threshold Sk for the predictions of the model,
- to calculate the confidence interval Ik for prediction of the model M for each of the examples of the test base,
- and to introduce into the learning base all the examples of the test base of which the confidence interval Ik is greater than Sk.

In the course of the operation of the process, it is possible to measure at least one result and the corresponding observable quantities in such a way as to determine at least one supplementary example which is added to the learning base and, with the new learning base thus obtained, to evaluate the performance of the model and, if necessary, adjust the parameters of the model.

The model M is for example a neural network.

The technical process may in particular be spot-welding of metal sheets.

In this case the result R is, for example, the diameter $\Phi$ of the weld nugget and the desired values $C_1, \ldots, C_n$ are the welding force $F_s$, the welding intensity $I_s$, the welding time $\Delta t_s$ and the forging time $\Delta t_f$. The observable quantities are, for example, the total electrical energy $E_t$, the maximum expansion in the course of welding $\Delta z_s$ and the maximum contraction during the forging phase $\Delta Z_f$.

The control law L may be defined in the following way:

- a minimum value $\Phi_{min}$ and a maximum value $\Phi_{max}$ are chosen for the diameter of the weld nugget,
- a number qm is chosen,
- the moving mean $\Phi_{mg}$ of the qm last predictions of the diameter of the weld nugget $\Phi$ is formed,
- if $\Phi_{mg}>\Phi_{max}$ the desired value Ic of the welding intensity is decreased, if $\Phi_{min} \leq \Phi_{mg} \leq \Phi_{max}$ the desired value Ic of the welding intensity is not modified, if $\Phi_{mg}<\Phi_{min}$ the desired value Ic of the welding intensity is increased.

It is also possible to fix a value $R_0<R_{min}$ and, if the last prediction of the diameter of the weld nugget $\Phi$ is less than $\Phi_0$, the desired value Ic of the welding intensity is increased.

It is also possible to fix a welding intensity increment $\Delta Ic$ and, when the desired value Ic of the welding intensity is decreased or increased, the increment $\Delta Ic$ is subtracted from or added to Ic.

This method is preferably implemented by a computer.

BRIEF DESCRIPTION OF THE DRAWINGS

The invention will now be described in greater detail for the example of spot-welding with reference to the accompanying drawings, in which.

DETAILED DESCRIPTION OF THE EXEMPLARY EMBODIMENTS

Figure 1:
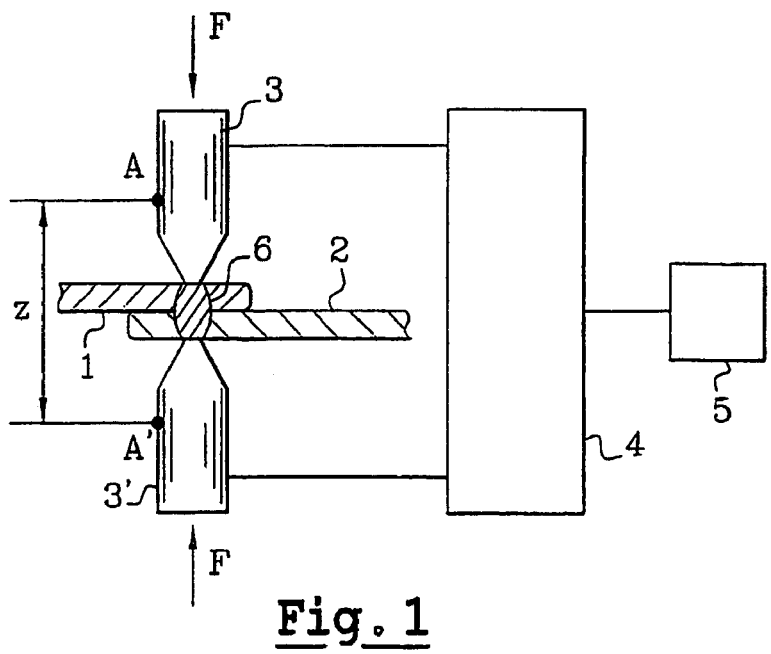
FIG. 1 is a basic diagram of the spot-welding of two metal sheets.

Spot-welding is a method of assembling two metal sheets which is known per se. Two sheets 1 and 2 (FIG. 1) are disposed one upon the other in a marginal overlap zone and are clamped between two electrodes 3 and 3' connected to a control module 4 having a transformer connected to a source of electricity 5. With the aid of the electrodes an electric current of intensity Ic is made to pass during a limited time through the contact zone 6 of the sheets which is situated between the electrodes. The passage of the electric current in the contact zone 6 causes the metal to heat up which makes it melt and form a molten core 7 (FIG. 2) surrounded by a zone affected by the heat 8a which has indentations 9 and 9' caused by the pressure of the electrodes. After the passage of the electric current, the molten core 7 solidifies and ensures a connection between the two sheets. In general, in order to assemble the two sheets a plurality of spot-welds are produced which are disposed along the overlap zone of the sheets.

Figure 3:
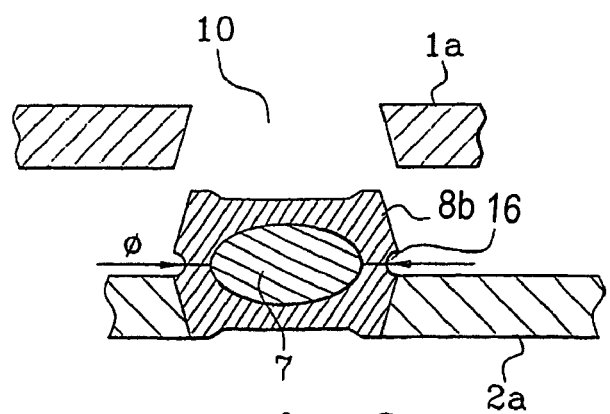
FIG. 3 is a schematic sectional view of a spot-weld nugget after pulling apart.

The whole area consisting of the zone which is molten then solidified 7 and the zone affected by the heat 8a is called the weld nugget 8b (FIG. 3).

The quality of the weld, that is to say the mechanical resistance of the weld nugget, is evaluated by the average diameter of the latter. In order to measure this average diameter, a portion of spot-welded sheets containing a weld nugget is taken and the two pieces of sheet are separated by pulling apart. Then (FIG. 3) a portion of sheet 1a containing an approximately round hole 10 and a portion 2a containing the nugget 8b are obtained. In order to measure the diameter $\Phi$ of the nugget, the largest and the smallest diameter of the nugget are measured and the arithmetic mean of these two measurements is formed. This measurement is made in the groove 16 which is situated approximately at the interface between the two sheets. Thus the quality of the weld is a measurable quantity, the measurement of this quality being the diameter of the weld nugget. It should be noted that the quality of the weld can also be measured by other means, for example by measuring the force of pulling apart the weld nugget; the person skilled in the art knows how to determined these methods of measuring the quality of the weld nugget. However, this quantity is not observable in the sense which was defined above, since in order to measure it it is necessary to destroy the weld and consequently it is not possible to measure it in real time, that is to say as the weld is being produced.

The welding process comprises the following steps:
putting the sheets in place between the electrodes,
docking, an operation consisting of bringing the electrodes closer to the sheets and progressively clamping them by increasing the clamping force up to a nominal value,
fusion of the molten core by passing current through during a predetermined time,
forging by maintaining the clamping force during a predetermined time,
relaxation of the clamping by moving the electrodes apart.

Each of these steps lasts a fraction of a second or about a second, the complete cycle lasting several seconds.

The quality of the welding, for sheets of a given thickness and type (nature of the metal, presence or absence of coating, etc.), depends upon the following parameters:
clamping force F of the electrodes against the sheets,
intensity of the welding current Is,
time during which the current $\Delta t_s$ is made to pass through,
time during which the force for forging $\Delta t_f$ is applied,
state of wear of the electrodes.

For each of these parameters, except for the state of wear of the electrodes, desired values are defined which are those which must be produced with the aid of the welding machine controlled by its automatic systems.

It will be observed that, at a given clamping force F, a given time for passage of the current $\Delta t_s$ and a given forging time $\Delta t_f$ the quality of welding (measured by the diameter of the nugget $\Phi$) varies with the current Is (FIG. 4) starting from a minimum value $\Phi_{min}$ and reaching a maximum value $\Phi_{max}$ when the current Is passes from a value $I_{min}$ to a value $I_{max}$, the value above which a phenomenon called expulsion is observed corresponding to the fact that the fusion is too great so that the molten metal is expelled without the diameter of the nugget increasing; in fact, this latter decreases, as the curve 11 indicates.

Figure 4:
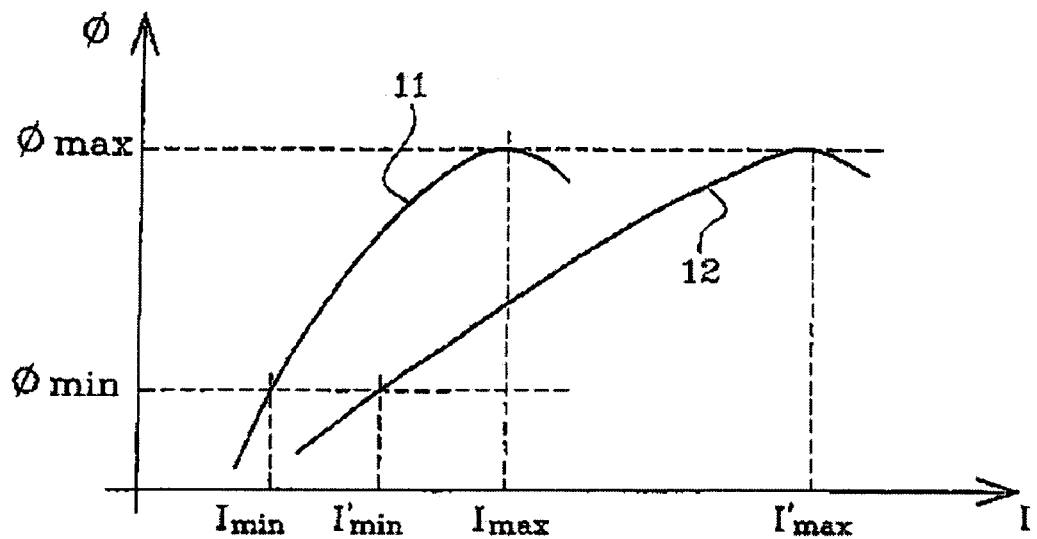
FIG. 4 is a diagram showing the development of the diameter of the weld nugget as a function of the welding intensity for two states of wear of the welding electrodes.

However, the diameter of the weld nugget also depends upon the wear of the electrodes (which is reflected inter alia by an increase in the diameter of the ends of the electrodes). The effect of this wear is to deform the nugget diameter=f (intensity) curve by displacing it towards the high intensities and decreasing its gradient, as can be seen in FIG. 4, in which the curve 11 corresponds to a new electrode and the curve 12 to a worn electrode. For the worn electrode the minimum diameter $\Phi_{min}$ corresponds to an intensity $I'_{min} > I_{min}$ and the maximum diameter $\Phi_{max}$ corresponds to an intensity $I'_{max} > I_{max}$; the difference between $I_{max}$ and $I'_{max}$ being substantially greater than the difference between $I'_{min}$ and $I_{min}$.

In order for the welding to be satisfactory, it is necessary for the diameter of the weld nugget to be between $\Phi_{min}$ and $\Phi_{max}$ and for the intensity to be less than the intensity for which the phenomenon of expulsion appears. As the electrodes wear during production of the welds, in order to guarantee the quality of the successive spot-welds it is necessary at least to make the instruction develop as the number of spot-welds produced with the same electrodes increases.

Figure 5:
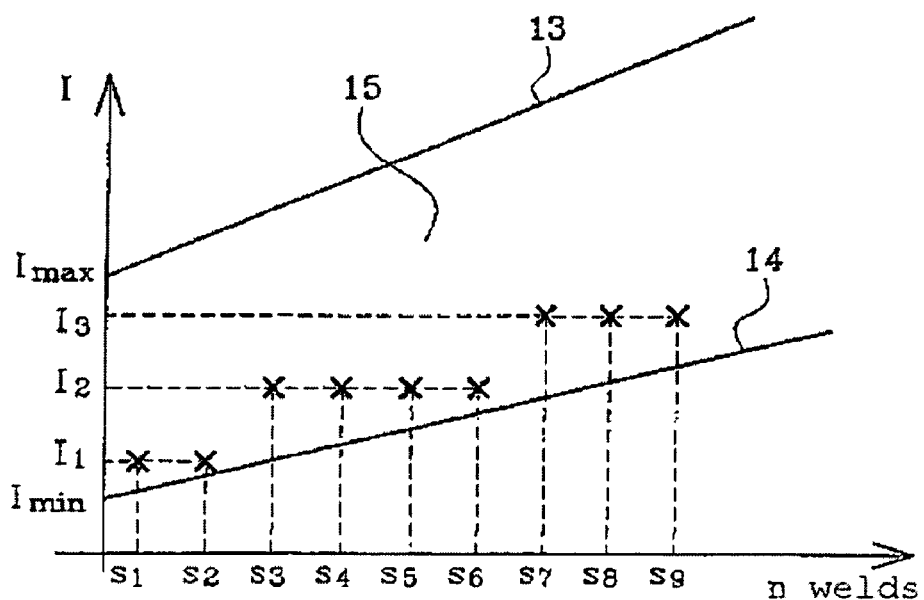
FIG. 5 is a diagram showing the development of the welding intensity instruction as a function of the number of welds produced.

FIG. 5 shows a diagram representing "number of welds/intensity" in which the curves 13 and 14 are shown which represent respectively the development of $I_{max}$ and $I_{min}$ as a function of the number of welds (the scale of the horizontal axis corresponding to the number of welds is arbitrary and is chosen so that the curves 13 and 14 are straight lines, which is purely formal).

The curves 13 and 14 delimit a zone of weldability 15 in which the points of operation are located which correspond to the successive welds referenced $s_1$ to $s_9$. These welds are disposed "in steps", which corresponds to the usual manner of controlling a spot-welding installation, known by the name of "law of phase difference". As in reality the curves 13 and 14 do not have a conveniently known form, it is appropriate to determine the number of welds after which it is necessary to modify the intensity instruction and to what extent. It is the object of the present invention, applied to spot-welding, to determine automatically when to vary the intensity instruction and by how much.

In order to aid understanding of the invention, an elementary cycle for carrying out a spot-weld will now be described in greater detail with reference to FIG. 6.

Figure 2:
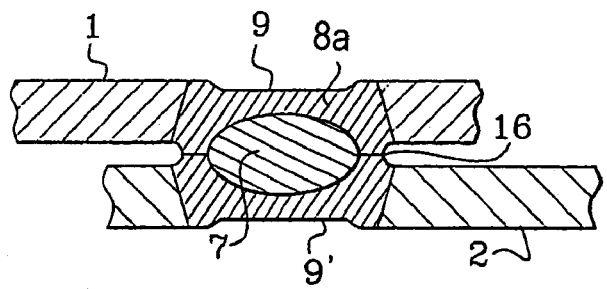
FIG. 2 is a schematic sectional view of a spot-weld nugget.
Figure 6:
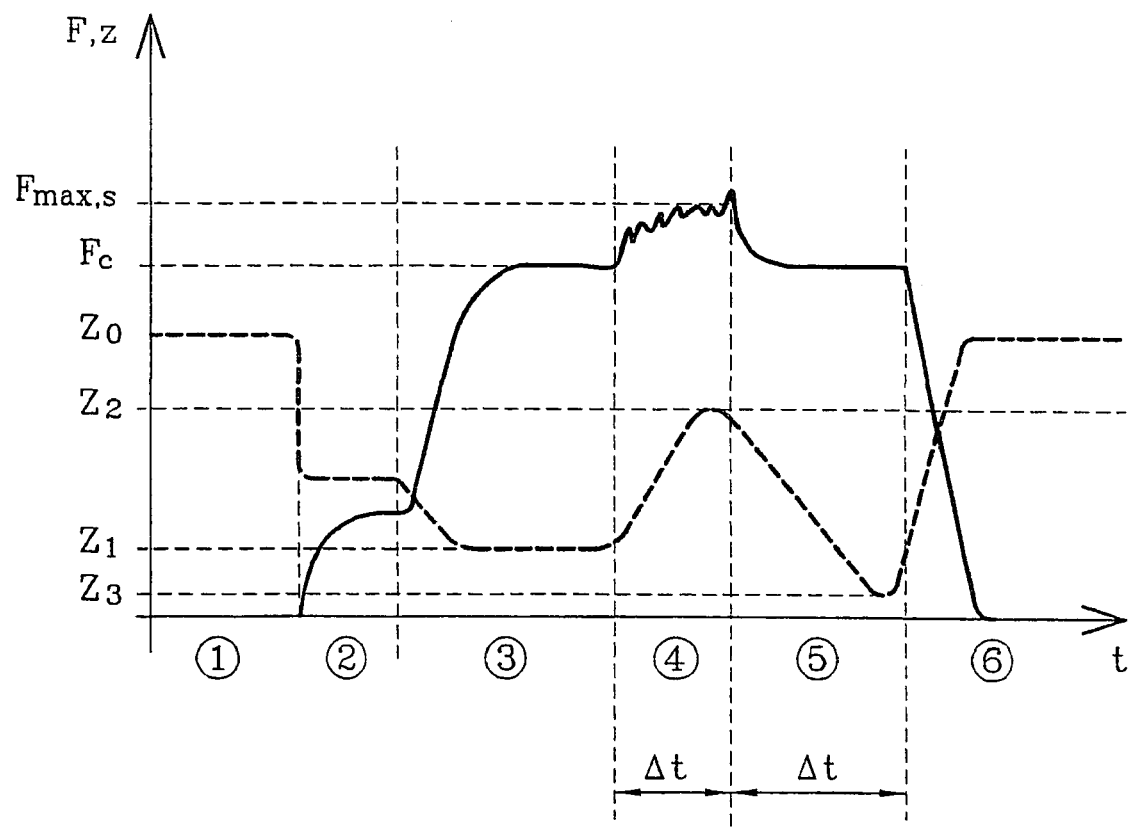
FIG. 6 shows schematically the development of several characteristic quantities of the welding in the course of producing a spot-weld.

FIG. 6 shows the development over time of two observable quantities, which are:
 the force F clamping the electrodes against the assembly to be welded,
 the spacing z between the electrodes; this spacing is measured by the distance between two arbitrary reference points A and A' defined on each of the electrodes (FIG. 1).

These two quantities can be measured in real time with the aid of force and displacement sensors with which the welding machine is equipped in a known manner.

Six successive phases are observed in FIG. 6, which are:
1: before clamping of the electrodes the force is zero and the spacing has a value $z_0$ which is sufficient to permit positioning of the sheets to be assembled between the electrodes,
2 and 3: docking, the electrodes move towards one another until they arrive in contact with the sheets, the distance z decreases, then the force increases to reach the desired force $F_c$ and the distance z is established at a value $z_1$ corresponding to the contact of the two sheets on one another,
4: welding, the electric current is made to pass through with a desired intensity Ic. During this phase, due to the expansion of the sheets resulting from the heat generated by the electric current, the force F increases up to a value $F_{max,s}$, the spacing z between the electrodes increases up to a value $z_2$,
5: forging, the force is maintained but the supply of electric current is cut off, the force stabilises at the value $F_c$ and the electrodes move towards one another slightly forming indentations in the zones of contact with the sheets, the distance z passes through a minimum $z_3$,
6: end of welding, the electrodes are moved apart in order to disengage or displace the sheets.

It can also be seen in this drawing that the quantities F and z vary with time.

At each moment F(t) and z(t) can be measured. Using electrical measurements which are known per se, it is also possible to measure the momentary intensity i(t) and the momentary voltage u(t) during the phase 4.

In order to control the welding process, the desired values are fixed which are the force Fc and the intensity Ic as well as the durations of welding $\Delta t_s$ and of forging $\Delta t_f$. By suitable computer processing, which the person skilled in the art will know how to carry out, of the measurements F(t), z(t) and u(t) it is possible to determine, after carrying out a spot-weld, quantities which are observable in the sense which has been defined above.

These observable quantities are for example:
 the maximum welding force $F_{max,s}$,
 the maximum expansion in the course of welding $\Delta z_{max,s} = z_2 - z_1$,
 the maximum shrinkage in the course of forging $\Delta z_{max,f} = z_2 - z_3$,
 the total electrical energy consumed $E_{élec} = \int u(t).i(t).dt$, (the integration is made over the duration of the welding).

It should be noted that in this process the observable quantities which have just been defined are not input quantities nor output quantities nor desired values.

On the basis of these observable quantities, and particularly on the basis of the quantities $\Delta z_{max,s}$, $\Delta z_{max,f}$ and $E_{élec}$, it is possible to calculate a forecast value of the diameter $\Phi_p$ of the weld nugget. In order to calculate $\Phi_p$ a model M is used which as variables the observable quantities $\Delta z_{max,s}$, $\Delta z_{max,f}$ and $E_{élec}$, and such that:

$$\Phi_p = M(\Delta z_{max,s}, \Delta z_{max,f}, E_{élec}).$$

In this example, and reverting to the terminology defined above, the quantity $\Phi$ represents the result R. The model M takes into account the three observable quantities $\Delta Z_{max,s}$, $\Delta Z_{max,f}$ and $E_{élec}$, but it could take other into account and it could involve one or several desired values such as Ic, Fc, $\Delta t_s$ and $\Delta t_f$. It is important, however, to note that the model takes into account at least two independent variables, of which at least one is an observable quantity, which is necessary in order to evaluate $\Phi_p$. In effect, taking into account of only one of these measurable quantities, completed if need be by taking into account of one or several desired values, or simply taking into account of the desired values, does not enable $\Phi_p$ to be evaluated with sufficient precision.

As has been indicated previously, the control of the spot-welding process consists of determining, after each production of a weld, the desired values to be applied in order to carry out the following weld in a satisfactory manner. More particularly, it consists of determining the desired value Ic of the current intensity so that the diameter of the weld nugget is satisfactory, that is to say it is within the two values $\Phi_{min}$ and $\Phi_{max}$ defined above, and so that the desired value Ic of the current is situated within the weldability range.

Thus for each welding operation:
 the observable parameters necessary in order to determine the observable quantities used by the model M are recorded; in the present case these are $\Delta z_{max,s}$, $\Delta z_{max,f}$ and $E_{élec}$,
 with the aid of the model M an estimate of the result $R_{es}$ is calculated, equal in the present case to the diameter of the weld nugget: $R_{es} = \Phi_p = M(\Delta z_{max,s}, \Delta z_{max,f}, E_{élec})$,
 with the aid of a control law L having as input variable at least $R_{es}$, the desired value of the current Ic is calculated for the following welding operation: $Ic = L(R_{es})$,
 and the following welding operation is carried out using the new desired value of the intensity.

Several control laws are possible. In particular, it is possible to use the control law L defined in the following manner:
 a minimum value $\Phi_{min}$ and a maximum value $\Phi_{max}$ are chosen for the diameter of the weld nugget,
 a number qm is chosen, the moving mean $\Phi_{mg}$ is formed of qm last predictions of the diameter $\Phi$ of the weld nugget, if $\Phi_{mg} > \Phi_{max}$ the desired value Ic of the welding intensity is decreased, if $\Phi_{min} \leq \Phi_{mg} \leq \Phi_{max}$ the desired value Ic of the welding intensity is not modified, if $\Phi_{mg} < \Phi_{min}$ the desired value Ic of the welding intensity is increased.

It is also possible to fix a value $\Phi_0 < \Phi_{min}$ and, if the last prediction of the diameter of the weld nugget $\Phi$ is less than $\Phi_0$, the desired value Ic of the welding intensity is increased.

In order to adjust the desired value of the intensity, a welding intensity increment $\Delta Ic$ is fixed and, when the desired value Ic of the welding intensity is decreased or increased, the increment $\Delta Ic$ is subtracted from or added to Ic.

The model M is a statistical model constructed on the basis of a learning base $B_{ap}$ consisting of all the desired values, the observable quantities as well as the measurements of the result which are obtained for a series of N spot-welds. It can be validated on a test base $B_{test}$ made up in the same way as the learning base but with different examples from those which make up the learning base.

The model M is for example a neural network, but it can be any type of statistical model.

The construction of the model and its use will now be described in a general manner, then the particular features of the application to spot-welding will be described.

As has been indicated above, the learning base is made up of a set of N observations, referenced by an index i, chosen in such a way as to best cover the possible conditions of carrying out the process to be measured.

The following are made to correspond to each observation i:

the result $R_i$ obtained (measured), n variables $x^i_1, \ldots, x^i_n$, corresponding to the desired values and the observable quantities measured and forming the vector $x^i$; it may be noted that these variables may equally correspond to input quantities which in the case of spot-welding may be for example the thickness and the nature of the sheets to be welded; however, in the present case it is considered that all the observations are made with identical sheets.

In the same way, the test base is composed of N' observations for each of which the measured values of R and n variables $x_1, \ldots, x_n$ which constitute the vector x are made to correspond.

The model M is a function of suitable form which the person skilled in the art will know how to choose as a function of the type of model which he wishes to use; this may be a polynomial of the n variables $x_1, \ldots, x_n$ or a neural network including at least one non-linear neuron and depending upon the same variables. This function depends upon parameters $\theta_1, \ldots, \theta_q$ which constitute a vector $\theta$. It makes it possible to calculate an estimate of the result $R_{est} = M(x; \theta)$ (or in developed fashion: $R_{est} = M(x_1, \ldots, x_n; \theta_1, \ldots, \theta_q)$). This model may be adjusted on the learning base by seeking the vector $\theta_a$ which minimises the score S, also denoted $S(M;B_{ap})$ when it is calculated for the model M on the learning base $B_{ap}$, equal to the sum, for all of the points of the learning base, of the values of a cost function J which is for example the standard deviation between the estimate made by the model and the result effectively measured:

$$J(x) = (R_{est} - R)^2 = M(x; \theta) - R)^2$$

This cost function J is a function of the variable x which depends upon the parameters vector $\theta$, so that it can be written in the form $J(x_1, \ldots, x_n; \theta_1, \ldots, \theta_q)$.

This then gives:

$$S(M; B_{ap}) = \sum_{i=1,N} J(x_i) = \sum_{i=1,N} (R_{est,i} - R_i)^2$$

The vectors $x^1, \ldots, x^N$ are the vectors corresponding to the different points of the learning base $B_{ap}$. The search for the vector $\theta_a$ may be made by any cost minimisation method known to the person skilled in the art, such as for example the quasi-Newton algorithm (described for example in W.H. PRESS & al, "*Numerical Recipes in C: The art of Scientific Computing*" second Edition, Cambridge University Press, 1992) or the Levenburg-Marquardt algorithm (described for example in K. LEVENBURG, "*A Method for the Solution of Certain Non-linear Problems in Least Squares*", Quarterly Journal of Applied Mathematics II (2), pp. 164–168, 1994, and in D. W. MARQUARDT, "*An Algorithm for Least-Squares Estimation of Non-linear Parameters*", Journal of the Society of Industrial and Applied Mathematics 11 (2), pp. 431–441, 1963).

Thus an adjusted model $M_a(x; \theta_a)$ is obtained. Such a model can be tested on the test base $B_{test}$ by calculating the score S which is equal to the cost function, calculated for the points of the test base:

$$S(M_a; B_{test}) = \sum_{i=1,N'} = F(x^i); x^1, \ldots, x^{N'} \text{ belonging to } B_{test}$$

The score can equally be calculated, in the same manner, on the learning base.

However, for one and the same type of model, models may be envisaged which include more or fewer parameters. For example, if the model is of the polynomial type of the $1^{st}$ degree or of a higher degree. Equally, if the model is of the neural network type a model may be chosen which includes one or several neuron(s). The score of a model depends particularly upon the number of parameters, and in particular when this number increases the score decreases, which is desirable since a model is all the better as its score is low, in so far as there is no over-adjustment. In effect, the measurement results which constitute the learning or test bases are tainted by errors which introduce a random noise. By increasing the number of parameters too much, it is possible to obtain a model of which the score on the learning base is zero, which might appear ideal but which in reality is a defect. In effect, such a model predicts perfectly not the phenomenon to be modelled but the phenomenon to which is added the noise which has affected the learning base. As a result the application of such a model to a point not contained in the learning base will give an a priori result tainted by a major error.

Moreover, for one and the same type of model, that is to say for a given algebraic form and a given number of parameters, the cost function admits in the general case several minima, that is to say several parameters vectors $\theta_a$. One model corresponds to each of these parameters vectors.

In order to seek the best model, that is to say the one which will have the lowest score whilst not being affected by an over-adjustment, it is possible to use methods which are known per se, such as the methods known as "cross validation" or "regularisation".

However, these methods are not only unwieldy but also they are not always sufficiently effective. Also, the inventor has devised a new method with improved performance over the known methods.

In order to implement this method, the procedure is as follows:
- a model structure is chosen in which the number of parameters can be chosen arbitrarily,
- a first adjusted model is determined as indicated above, including $q_1$ parameters: $M_{a,1}(x; \theta_{a,1})$, in which $\theta_{a,1}$ is vector of dimension $q_1$,
- the Jacobian Z of the model $M_{a,1}(x; \theta_{a,1})$ is calculated. For this, the functions $M_{a,1}(x^i; \theta)$ are considered in which it is considered that the parameters vector $\theta$ of the model is variable. The matrix Z is then the matrix having $q_1$ lines and N columns of which the terms $z_{i,j}$ are equal to:

$$z_{i,j} = \partial M_{a,1}(x^i; \theta)/\partial \theta_j \text{ at the point } \theta = \theta_{a,1}$$

then for each observation i of $B_{ap}$ the following scalar, denoted $h_{ii}$, is calculated:

$$h_{ii} = (z_{i,1}, \ldots, z_{i,q1})({}^tZZ)^{-1t}(z_{i,1}, \ldots, z_{i,q1})$$

then, on the learning base a generalised score is calculated of the model having as the parameters vector $\theta_{a,1}$:

$$E(\theta_{a,1}) = \sum_{i=1,N} [(M_{a,1}(x^i; \theta_{a,1}) - R_i)/(1 - h_{ii})]^2$$

and a quantity $$\mu(\theta_{a,1}) = (N \cdot q_1)^{-1/2} \sum_{i=1,N} h_{ii}^{1/2}$$

is calculated
- then in the same manner models are determined which have, according to choice, different structures or different numbers of parameters, or which correspond to different minima of one and the same cost function. Then a series of models $M_{a,k}$ is obtained with which the quantities $E(\theta_{a,k})$ and $\mu(\theta_{a,k})$ are associated.
- by comparing the values of $E(\theta_{a,k})$ and $\mu(\theta_{a,k})$ the model $M_{a,k}$ is then determined for which $E(\theta_{a,k})$ is amongst the smallest values obtained and $\mu(\theta_{a,k})$ is maximal. This model corresponds to the optimal model which is denoted $M_{a,opt}$. This is the model which is then used in order to effect regulation of the process.

In order to determine the optimal model it is possible, for example, to proceed in the following manner:
- a plurality of models $M_{a,k}$ are considered for which the corresponding values of $E(\theta_{a,k})$ and $\mu(\theta_{a,k})$ are calculated,
- the set consisting of the values of $E(\theta_{a,k})$ is considered, this set includes a smaller value $\min[E(\theta_{a,k})]$, and at least two models are retained of which the values of $E(\theta_{a,k})$ are closest to $\min[E(\theta_{a,k})]$, for this any criterion may be used which the person skilled in the art can determine,
- the models which have been selected as indicated are considered, and amongst those models the one for which the value of $\mu(\theta_{a,k})$ is greatest is retained; this model is the model considered as optimal.

Thus the model having the greatest $\mu(\theta_{a,k})$ is chosen from amongst the models having the smallest $E(\theta_{a,k})$.

It is also possible, using a method which is known per se, to choose a "set of models" consisting of a plurality of models which are acceptable a priori, and each time that it is wished to make a forecast the set of models is used in order to determine the most relevant forecast (see for example CLEMEN, R. T. "*Combining forecasts: A review and annotated bibliography*", International Journal of Forecasting, Vol 5, pp 559–584, 19890.

In the following reference will be made simply to a "model", but the explanation which will be given could be transposed mutatis mutandis by the person skilled in the art to a "set of models".

The model thus obtained is not necessarily satisfactory, which is the case in particular when the learning base does not contain enough points or when these points are not distributed in a satisfactory manner in the space for the entries. In order to evaluate the quality of the model and if need be to improve it, the test base can be used. For this, the procedure is as follows:
- a range of estimation of the standard deviation of the measurement noise $[\sigma_{min}, \sigma_{max}]$ is determined a priori by preliminary tests for the measurement of the result R,
- then the score of the model $M_{a,opt}$ is calculated on the test base: $S(M_{a,opt}; B_{test})$ and this score is compared with the range $[\sigma_{min}, \sigma_{max}]$; if $\sigma_{min} < S(M_{a,opt}; B_{test}) < \sigma_{max}$, it is considered that the model is satisfactory; in the opposite case, the learning base is enhanced with one or several points taken from the test base and the calculation of an optimal model is recommenced.

The examples taken from the test base and introduced into the learning base can be chosen in various ways. However, it is preferable to choose the points for which the confidence interval for estimation of the result R made by the model is the greatest, that is for which this estimate is the most uncertain. This confidence interval of the point i, irrespective of whether it belongs to the learning base or to the test base, is determined by the coefficient $h_{ii}$ defined previously. More precisely, it is proportional to $h_{ii}^{1/2}$. This adjustment or resetting of the model can be made in the course of execution of the process, by taking measurements of the result from time to time in such a way as to constitute a test base with the aid of which the performance of the model is evaluated and, if necessary, the learning base is enhanced in order to recalculate a model with better performance.

In the particular case of spot-welding, according to the invention:
- by preliminary tests a first learning base is constructed and, by tests of reproducibility of the measurement, the dispersion range of the standard deviation of the measurement noise $[\sigma_{min}, \sigma_{max}]$ is evaluated for the measurement of the diameter of the weld nugget (the result R). This learning base is constructed by producing series of spot-welds with welding intensities varying alternately between the lower limit of weldability and the upper limit of weldability without causing the other desired values to vary, these being the welding time, the forging time and the welding force. This makes it possible to construct a model which will serve to control the welding without varying the duration of a cycle, that is to say preserving a constant productivity.
- a statistical model, and preferably a neural model, is considered, having as input variable the observable quantities defined above and as output variable the estimate of the diameter of the weld nugget. With the aid of the learning base, and by applying for example the method which has just been defined, the model is optimised. The inventors have found that a good model is in particular a model of which the input variables are $\Delta z_{max,s}$, $\Delta z_{max,f}$ and $E_{élec}$, as indicated above, in order to regulate the process, the model is used as indicated above in order to re-update, if necessary, the desired welding value Ic after each spot-weld is produced.

Furthermore, and in order to improve the model, it is possible during the entire duration of operation of the process to take samples of welded sheets and to measure the diameter of the weld nugget in such a way as to constitute a test base. With the aid of this test base the score of the model is calculated; if this score is satisfactory the model is not modified; if this score is not satisfactory the points for which the prediction is the most uncertain, that is to say for which the confidence interval is greater than a value Sk fixed in advance, are extracted from the test base and these points are introduced into the learning base in order to enhance it. With this enhanced learning base an optimised model is recalculated and the regulation of the process is continued with this new model. As will be easily understood, the application of the method which has just been described is not limited to the case of spot-welding but is applicable to any process which may be the subject of modelling.

Irrespective of whether it is applied in the general case or in the case of spot-welding, the method is implemented by a computer connected to sensors and to a module for controlling the process. This computer includes programs intended to calculate the optimal model on the basis of files in which are recorded the data relating to the learning and test bases, programs intended to use the optimal model on the basis of data measured over the process, to calculate the desired values on the basis of the control law, and to send these desired values to the equipment intended to carry out the process. The person skilled in the art will be able to produce such an automatic system.

In the particular case of spot-welding, the equipment intended to carry out the process is a spot-welding machine which is known per se and has, also in a known manner, means for measurement of the position of the electrodes, the force, the momentary intensity and voltage, as well as control means. These means are connected in a known manner to the computer, either directly or by way of particular automatic devices which are known per se.

The invention claimed is:

1. Method of regulating and controlling a technical process which is executed in time either in a continuous manner or in a discontinuous manner by applying at each time t desired values $\{C_1(t), \ldots, C_n(t)\}$ leading to a result R(t) which is measurable but not observable and generating a plurality of observable quantities separate from the result R(t) of which at least two are independent $\{G_1(t), \ldots, G_m(t)\}$, characterized in that:

at least two independent observable quantities $G_1(t), \ldots, G_p(t)$ from the plurality of the observable quantities $\{G_1(t), \ldots, G_m(t)\}$, are measured, with the aid of a predictive model M, or a set of models, of which the variables include the at least two independent observable quantities, an estimate $R_{es}(t)=M(G_1(t), \ldots, G_p(t))$ of the result R(t) is calculated, with the aid of a control law L of which the input variable is the estimated result $R_{es}(t)$, new desired values $\{C_1(t+1), \ldots, C_n(t+1)\}=L(R_{es}(t))$ are calculated which are applicable for the time t+1, the desired values $\{C_1(t), \ldots, C_n(t)\}$ are replaced by the desired values $\{C_1(t+1), C_n(t+1)\}$, and the predictive model M is a statistical adjustment model depending upon parameters $\{\theta_1, \ldots, \theta_p\}$ which constitute a parameters vector $\theta$ adjusted on a learning base $B_{ap}$ consisting of all of the desired values, the measurements of the observable quantities and the measurement of the result for a plurality of successive executions of the technical process.

2. Method as claimed in claim 1, characterized in that in order to determine the model M:

a model structure is chosen depending upon a parameter vector $\theta$, a cost function J is chosen, with the learning base a succession of adjusted models $M_{a,k}$ is calculated corresponding to different parameter vectors $\theta_k$ of dimension $q_k$ which minimise, globally or locally, the cost function on the learning base, for each model $M_{a,k}$ the coefficients $h_{ii}$ of each of the examples of the learning base are calculated, and the generalised score of the model $M_{a,k}$ is calculated:

$$E(\theta_{a,k}) = \sum_{i=1,N} [(M_{a,k}(x^i; \theta_{a,k}) - R_i)/(1 - h_{ii})]^2$$

and a quantity $$\mu(\theta_{a,k}) = (N \cdot q_k)^{-1/2} \sum_{i=1 \text{ to } N} h_{ii}^{1/2}$$

is calculated and the model $M_{a,k}$ having the greatest $\mu(\theta_{a,k})$ is chosen from amongst the models having the smallest $E(\theta_{a,k})$; this model is the optimal model $M_{a,opt}$.

3. Method as claimed in claim 1, characterized in that:

for the measurement of the result R a dispersion range of the standard deviation of the measurement noise $[\sigma_{min}, \sigma_{max}]$ is determined, and the parameters $\{\theta_1, \ldots, \theta_p\}$ of the predictive model M are adjusted in such a way that on a test base $B_{test}$ it has a score $S=S(M; B_{test})$ such that $\sigma_{min} < S < \sigma_{max}$, the test base consisting of all of the desired values, the measurements of observable quantities and the measurement of the result for a plurality of successive executions of the technical process.

4. Method as claimed in claim 2, characterized in that in order to adjust the parameters $\{\theta_1, \ldots, \theta_p\}$ of the predictive model M, it is possible to choose a first learning base $B_{ap}$ and a first test base $B_{test}$, with the aid of the said first learning base a first estimate of the parameters $\{\theta_1, \ldots, \theta_p\}$ is determined in such a way that the score of the model M for the learning base is within the range $[\sigma_{min}, \sigma_{max}]$, then, using this first estimate of the parameters in the model M, with the aid of the first test base $B_{test}$, the score $S=S(M; B_{test})$ is evaluated and compared with the dispersion range $[\sigma_{min}, \sigma_{max}]$, if S is within the said range it is considered that the estimate of the parameters is satisfactory, in the opposite case the learning base $B_{ap}$ is completed with examples taken from the first test base in order to constitute a new learning base, the test base is completed if need be and the parameters $\{\theta_1, \ldots, \theta_p\}$ are determined again with the aid of the new learning base and the score S on the new test base, and the iterations are continued until the score S is within the dispersion range [$\sigma_{min}$, $\sigma_{max}$].

5. Method as claimed in claim 4, characterized in that in order to complete the learning base with examples taken from the test base:
- a confidence interval threshold Sk is fixed for the predictions of the model,
- the confidence interval Ik for prediction of the model M is calculated for each of the examples of the test base,
- and at least one of the examples of the test base of which the confidence interval Ik is greater than Sk, that is to say of which the estimate of the result is the most uncertain, is introduced into the learning base.

6. Method as claimed in claim 4, characterized in that the confidence interval Ik of the prediction of the model M for each example of the test base is proportional to the square root of the coefficient $h_{ii}$ of this example.

7. Method as claimed in claim 3, characterized in that in the course of the operation of the process, at least one result and the corresponding observable quantities are measured in such a way as to determine at least one supplementary example which is added to the learning base and, with the new learning base thus obtained, the parameters of the model are adjusted and the performance of the model is evaluated.

8. Method as claimed in claim 1, characterized in that the model M is a neural network.

9. Method as claimed in claim 1, characterized in that the technical process is the spot-welding of metal sheets.

10. Method as claimed in claim 9, characterized in that the result R is the diameter $\Phi$ of the weld nugget or any other comparable quantity such as, for example, the force of pulling apart the weld nugget, and the desired values $C_1, \ldots, C_n$ are the welding force $F_s$, the welding intensity $I_s$, the welding time $\Delta t_s$ and the forging time $\Delta t_f$.

11. Method as claimed in claim 10, characterized in that the observable quantities are the total electrical energy $E_{élec}$, the maximum expansion in the course of welding $\Delta z_{max,s}$ and the maximum contraction during the forging phase $\Delta z_{max,f}$.

12. Method as claimed in claim 10, characterized in that the control law L is defined in the following way:
- a minimum value $\Phi_{min}$ and a maximum value $\Phi_{max}$ are chosen for the diameter of the weld nugget,
- a number qm is chosen,
- the moving mean $\Phi_{mg}$ of the qm last predictions of the diameter of the weld nugget $\Phi$ is formed,
- if $\Phi_{mg} > \Phi_{max}$ the desired value Ic of the welding intensity is decreased, if $\Phi_{min} \leq \Phi_{mg} \leq \Phi_{max}$ the desired value Ic of the welding intensity is not modified, if $\Phi_{mg} < \Phi_{min}$ the desired value Ic of the welding intensity is increased.

13. Method as claimed in claim 12, characterized in that a value $\Phi_0 < \Phi_{min}$ is fixed and, if the last prediction of the diameter of the weld nugget $\Phi$ is less than $\Phi_0$, the desired value Ic of the welding intensity is increased.

14. Method as claimed in claim 12, characterized in that a welding intensity increment $\Delta Ic$ is fixed and, when the desired value Ic of the welding intensity is decreased or increased, the increment $\Delta Ic$ is subtracted from or added to Ic.

15. Method as claimed in claim 12, characterized in that in order to construct a learning base a succession of spot-welds are produced by alternately varying the desired value for the welding intensity Ic between the lower limit and the upper limit of the range of weldability and thus using the welding electrodes, the other desired values being kept constant.

16. Method as claimed in claim 1, characterized in that it is implemented by a computer.

* * * * *